(12) United States Patent
Camenisch et al.

(10) Patent No.: US 10,091,190 B2
(45) Date of Patent: Oct. 2, 2018

(54) SERVER-ASSISTED AUTHENTICATION

(71) Applicant: International Business Machines Corporation, Armonk, NY (US)

(72) Inventors: Jan L. Camenisch, Thalwil (CH); Anja Lehmann, Zurich (CH); Gregory Neven, Oberrieden (CH); Franz-Stefan Preiss, Zurich (CH); Kai W. Samelin, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 14/966,061

(22) Filed: Dec. 11, 2015

(65) Prior Publication Data

US 2017/0171185 A1      Jun. 15, 2017

(51) Int. Cl.
| | |
|---|---|
| *H04L 29/06* | (2006.01) |
| *H04W 12/06* | (2009.01) |
| *G06F 21/31* | (2013.01) |
| *G06F 21/44* | (2013.01) |

(52) U.S. Cl.
CPC ........... *H04L 63/083* (2013.01); *H04W 12/06* (2013.01); *G06F 21/31* (2013.01); *G06F 21/44* (2013.01)

(58) Field of Classification Search
CPC .............................. H04L 63/083; H04W 12/06
USPC ............................................................ 726/6
See application file for complete search history.

(56) References Cited

U.S. PATENT DOCUMENTS

| | | | | |
|---|---|---|---|---|
| 5,153,919 A | * | 10/1992 | Reeds, III | H04L 9/3236 |
| | | | | 380/247 |
| 6,161,185 A | * | 12/2000 | Guthrie | G06F 21/31 |
| | | | | 707/999.002 |
| 6,615,264 B1 | * | 9/2003 | Stoltz | G06F 21/31 |
| | | | | 709/225 |
| 6,792,536 B1 | * | 9/2004 | Teppler | G06F 21/64 |
| | | | | 713/178 |
| 6,996,714 B1 | * | 2/2006 | Halasz | H04L 63/061 |
| | | | | 713/163 |
| 7,024,690 B1 | * | 4/2006 | Young | H04L 9/3273 |
| | | | | 380/270 |
| 7,421,731 B2 | | 9/2008 | Mitchell et al. | |
| 7,552,467 B2 | * | 6/2009 | Lindsay | G06F 21/31 |
| | | | | 713/165 |

(Continued)

FOREIGN PATENT DOCUMENTS

| | | |
|---|---|---|
| EP | 2741444 A1 | 6/2014 |
| WO | 0101627 A3 | 1/2001 |

(Continued)

OTHER PUBLICATIONS

Jyotiyana, et al, 'Secure Authentication: Eliminating Possible Backdoors in Client-Server Endorsement', Intl. Confr. on Computational Modeling & Sec. (CMS 2016), entire doc., https://ac.els-cdn.com/S1877050916305750/1-s2.0-S1877050916305750-main.pdf?_tid=b8c62a21-ffeb-4f4a-9be1-745ceea174ce&acdnat=1524586601_e2d457fe9fc031f71f9683d13233b946.*

(Continued)

*Primary Examiner* — Luu Pham
*Assistant Examiner* — Ronald Baum
(74) *Attorney, Agent, or Firm* — Daniel C. Housley (57) ABSTRACT

Authentication of a device through a constructed authentication token. Components of an authentication key are distributed across at least a device and a server, diminishing a likelihood that an individual account is compromised by an attack.

16 Claims, 4 Drawing Sheets

(56) References Cited

U.S. PATENT DOCUMENTS

| | | | |
|---|---|---|---|
| 7,694,147 B2* | 4/2010 | Lott | G06F 21/31 713/183 |
| 7,725,730 B2 | 5/2010 | Juels et al. | |
| 8,418,235 B2* | 4/2013 | Sherkin | H04L 63/083 726/17 |
| 8,539,244 B2 | 9/2013 | Miura et al. | |
| 9,002,750 B1 | 4/2015 | Chu et al. | |
| 9,292,711 B1* | 3/2016 | Roth | G06F 21/71 |
| 9,467,293 B1* | 10/2016 | Brainard | G06Q 20/3823 |
| 9,947,008 B1* | 4/2018 | Camacho Diaz | G06Q 20/38215 |
| 2003/0093681 A1* | 5/2003 | Wettstein | H04L 63/0407 713/185 |
| 2004/0123159 A1* | 6/2004 | Kerstens | H04L 29/06 726/12 |
| 2004/0128517 A1* | 7/2004 | Drews | H04L 9/0841 713/180 |
| 2004/0143738 A1* | 7/2004 | Savage | G06Q 20/383 713/168 |
| 2004/0172535 A1* | 9/2004 | Jakobsson | G06Q 20/341 713/168 |
| 2005/0193198 A1* | 9/2005 | Livowsky | G06F 21/32 713/168 |
| 2007/0039042 A1* | 2/2007 | Apelbaum | G06F 21/46 726/6 |
| 2008/0091763 A1* | 4/2008 | Devonshire | G06F 9/548 709/201 |
| 2011/0055585 A1* | 3/2011 | Lee | H04L 9/0844 713/183 |
| 2011/0302421 A1* | 12/2011 | Harrison | H04L 9/3228 713/180 |
| 2013/0198516 A1* | 8/2013 | Fenton | H04L 63/0869 713/168 |
| 2013/0219473 A1* | 8/2013 | Schaefer | G06F 21/335 726/4 |
| 2013/0268632 A1 | 10/2013 | Baron et al. | |
| 2013/0333009 A1* | 12/2013 | Mackler | G06F 21/31 726/7 |
| 2014/0181529 A1* | 6/2014 | Joyce, III | H04L 63/083 713/183 |
| 2014/0237544 A1 | 8/2014 | Higuchi et al. | |
| 2014/0325220 A1* | 10/2014 | Tunnell | G06F 21/00 713/168 |
| 2015/0172272 A1* | 6/2015 | Levner | H04L 63/083 726/7 |
| 2015/0237502 A1* | 8/2015 | Schmidt | H04W 12/10 726/7 |

FOREIGN PATENT DOCUMENTS

| | | |
|---|---|---|
| WO | 0118635 A2 | 3/2001 |
| WO | 2015025916 A1 | 2/2015 |

OTHER PUBLICATIONS

SANS Institute, Integrate HMAC Capable Token into User Authentication Mechanism and Public Key Infrastructure, © SANS Institute 2001, entire doc., https://www.sans.org/reading-room/whitepapers/vpns/integrate-hmac-capable-token-user-authentication-mechanism-public-key-infrastructure-744.*

Bagherzandi, et al., "Password-Protected Secret Sharing", CCS'11, Oct. 17-21, 2011, Chicago, IL, Copyright 2011, ACM, 11 pages.

Camenisch, et al., "An Efficient System for Non-transferable Anonymous Credentials with Optional Anonymity Revocation*", Advances in Cryptology—EUROCRYPT 2001, printed Dec. 8, 2015, 30 pages.

Camenisch, et al., "Practical Yet Universally Composable Two-Server Password-Authenticated Secret Sharing*", ACM CCS 2012, ACM Press, Oct. 2012, 27 pages.

Ford, et al., "Server-Assisted Generation of a Strong Secret from a Passowrd", © 2000 IEEE, pp. 176-180, printed Dec. 8, 2015.

Kutylowski, et al., "Computer Security—ESORICS 2014", 19th European Symposium on Research in Computer Security, Wroclaw, Poland, Sep. 7-11, 2014, Proceedings, Part II, Springer, 19 pages.

Sood, et al., "A secure dynamic identify based authentication protocol for multi-server architecture", Journal of Network and Computer Applications, pp. 609-618, © 2010 Elsevier Ltd., vol. 34, Issue 2, Mar. 2011.

Steiner, et al., "Kerberos: An Authentication Service for Open Network Systems" Jan. 12, 1988, 15 pages.

Yi, et al., "ID-Based Group Password-Authenticated Key Exchange", printed Dec. 8, 2015, 23 pages.

* cited by examiner

SERVER-ASSISTED AUTHENTICATION

STATEMENT REGARDING FEDERALLY SPONSORED WORK

This invention was made with European Commission support under contract number ERC 321310 PERCY.

BACKGROUND

The present invention relates generally to the field of multiple computer communication, and more particularly to communication authentication techniques.

Authentication of a user and/or a device is a basic problem in the modern digital society. A user desires remote access to various accounts using a variety of devices. However, that same user desires security that does not allow an adversary (someone looking to improperly access the user's accounts) similar access to the user's various accounts, even if the adversary has access to a device belonging to the user.

Conventional methods of authentication employ a variety of primitives including, but not limited to: digital signatures; encryption; attribute-based credentials; and/or message authentication codes (MACs). These primitives require a variety of high-entropy cryptographic material. For example, an RSA key pair or a secret key. Questions arise as to where cryptographic material is stored. Storing cryptographic material on a user's device creates exposure if a device is lost or stolen. Alternatively, hardware tokens, which securely store and operate on cryptographic material (e.g., smart cards, trusted platform modules (TPMs)), can be cumbersome, expensive, or technically impossible to implement. For example, hardware tokens can be inconvenient for a user, introduce additional costs for hardware, introduce additional costs for distribution, and may require various hardware tokens for different devices and/or platforms. Further alternatives include storing cryptographic material for various users on a server, exposing many accounts if an adversary attacks the server.

SUMMARY

According to an aspect of the present invention, there is a method, computer program product, and/or system that performs the following operations (not necessarily in the following order): (i) transmitting a subset of a first set of account data, wherein the subset of the first set of account data includes an authentication token request transcript; (ii) receiving a first authentication token segment; and (iii) generating a full authentication token based, at least in part, on: (a) a first set of authentication key segments of a plurality of authentication key segments, (b) the authentication token request transcript, and (c) the first authentication token segment. The authentication token request transcript is a message and a dataset. The message and the dataset are derived, at least in part, from a password. At least generating the full authentication token is performed by computer software running on computer hardware.

According to an aspect of the present invention, there is a method, computer program product, and/or system that performs the following operations (not necessarily in the following order): (i) receiving a first set of account data, wherein the first set of account data includes an authentication token request transcript; (ii) generating a first authentication token segment, wherein the first authentication token segment is based, at least in part, on: (a) a first set of authentication key segments of a plurality of authentication key segments, and (b) the authentication token request transcript. The authentication token request transcript is a message and a dataset. The message and the dataset are derived, at least in part, from a password. At least generating the first authentication token segment is performed by computer software running on computer hardware.

DETAILED DESCRIPTION

Authentication of a device through a constructed authentication token. Components of an authentication key are distributed across at least a device and a server, diminishing a likelihood that an individual account is compromised by an attack. This Detailed Description section is divided into the following sub-sections: (i) Hardware and Software Environment; (ii) Example Embodiment; (iii) Further Comments and/or Embodiments; and (iv) Definitions.

I. Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
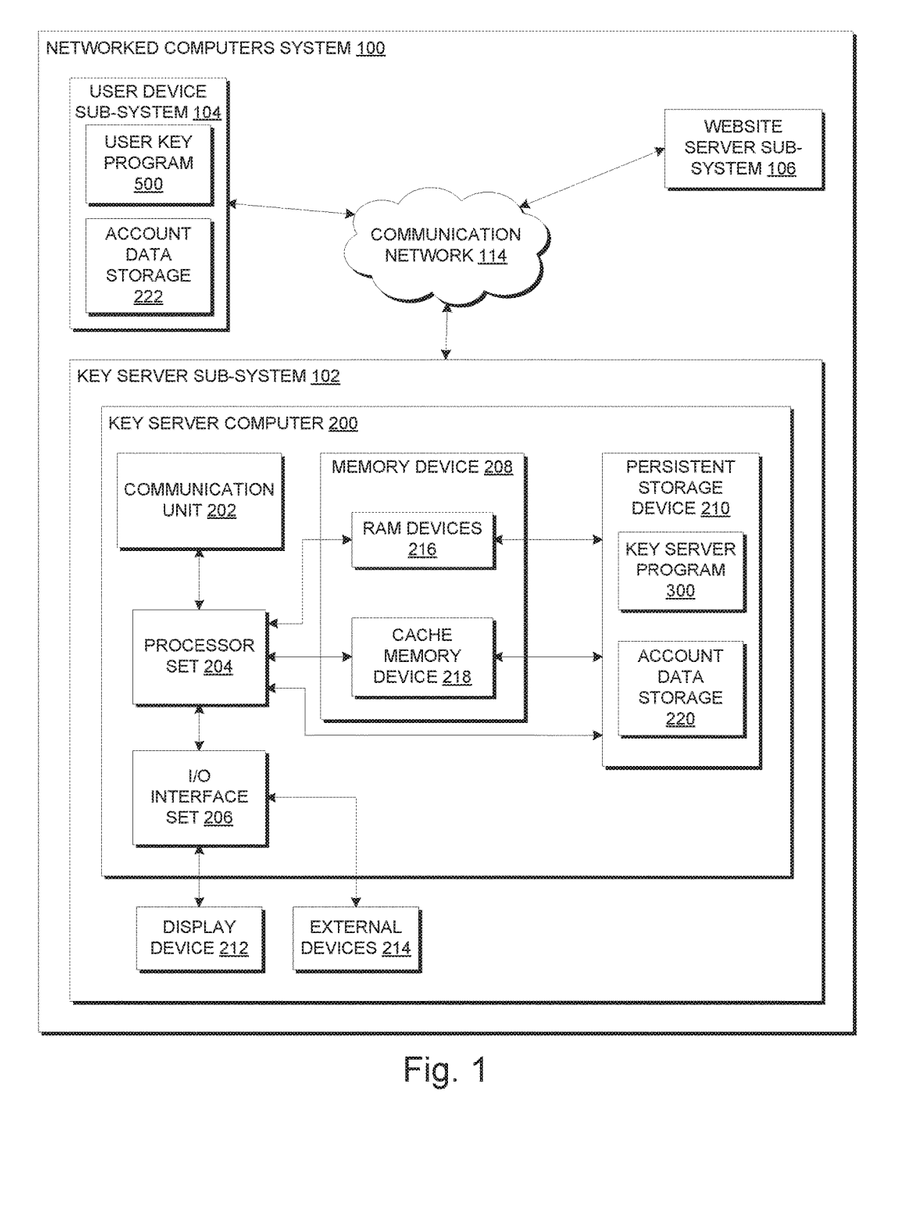
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: key server sub-system 102; user device sub-system 104; website server sub-system 106; and communication network 114. Key server sub-system 102 contains: key server computer 200; display device 212; and external devices 214. Key server computer 200 contains: communication unit 202; processor set 204; input/output (I/O) interface set 206; memory device 208; and persistent storage device 210. Memory device 208 contains: random access memory (RAM) devices 216; and cache memory device 218. Persistent storage device 210 contains: account data storage 220; key server program 300. User device sub-system 104 contains: account data storage 222; and user key program 500.

Key server sub-system 102 is, in many respects, representative of the various computer sub-systems in the present invention. Additionally, key server program 300 is, in many respects, representative of the various programs in the present invention. Accordingly, several portions of key server sub-system 102 will now be discussed in the following paragraphs.

Key server sub-system 102 may be a laptop computer, a tablet computer, a netbook computer, a personal computer (PC), a desktop computer, a personal digital assistant (PDA), a smart phone, or any programmable electronic device capable of communicating with client sub-systems via communication network 114. Key server program 300 is each a collection of machine readable instructions and/or data that is used to create, manage, and control certain software functions that will be discussed in detail, below, in the Example Embodiment sub-section of this Detailed Description section.

Key server sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between key server sub-system 102 and client sub-systems.

Key server sub-system 102 is shown as a block diagram with many double arrows. These double arrows (no separate reference numerals) represent a communications fabric, which provides communications between various components of key server sub-system 102. This communications fabric can be implemented with any architecture designed for passing data and/or control information between processors (such as microprocessors, communications processors, and/or network processors, etc.), system memory, peripheral devices, and any other hardware components within a system. For example, the communications fabric can be implemented, at least in part, with one or more buses.

Memory device 208 and persistent storage device 210 are computer readable storage media. In general, memory device 208 can include any suitable volatile or non-volatile computer readable storage media. It is further noted that, now and/or in the near future: (i) external devices 214 may be able to supply some, or all, memory for key server sub-system 102; and/or (ii) devices external to key server sub-system 102 may be able to provide memory for key server sub-system 102.

Key server program 300 is stored in persistent storage device 210 for access and/or execution by one or more processors of processor set 204, usually through memory device 208. Persistent storage device 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage device 210.

Key server program 300 may include both substantive data (that is, the type of data stored in a database) and/or machine readable and performable instructions. In this particular embodiment (i.e., FIG. 1), persistent storage device 210 includes a magnetic hard disk drive. To name some possible variations, persistent storage device 210 may include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer readable storage medium that is also part of persistent storage device 210.

Communication unit 202, in these examples, provides for communications with other data processing systems or devices external to key server sub-system 102. In these examples, communication unit 202 includes one or more network interface cards. Communication unit 202 may provide communications through the use of either or both physical and wireless communications links. Any software modules discussed herein may be downloaded to a persistent storage device (such as persistent storage device 210) through a communications unit (such as communication unit 202).

I/O interface set 206 allows for input and output of data with other devices that may be connected locally in data communication with key server computer 200. For example, I/O interface set 206 provides a connection to external devices 214. External devices 214 will typically include devices, such as a keyboard, a keypad, a touch screen, and/or some other suitable input device. External devices 214 can also include portable computer readable storage media, such as, for example, thumb drives, portable optical or magnetic disks, and memory cards. Software and data used to practice embodiments of the present invention (e.g., key server program 300) can be stored on such portable computer readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

Website server sub-system 106 is representative of various computer systems and/or computer servers requiring an authentication token to authenticate and/or verify a second computer system and/or computer server.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
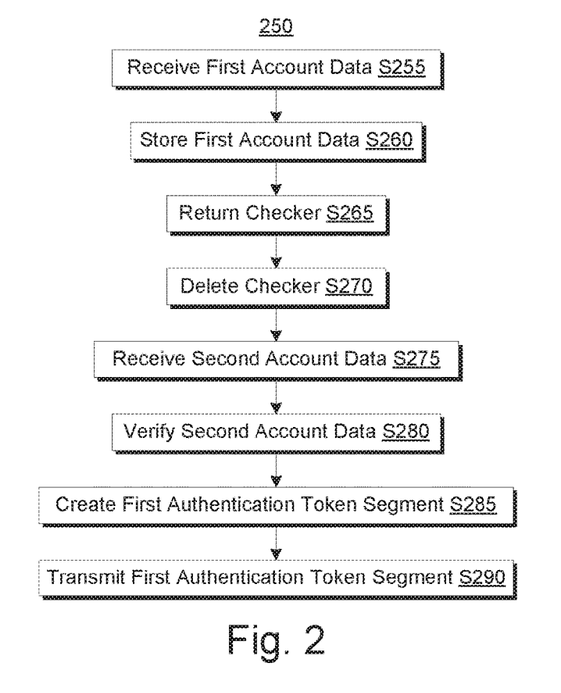
FIG. 2 is a flowchart showing a first embodiment method performed, at least in part, by the first embodiment system.
Figure 3:
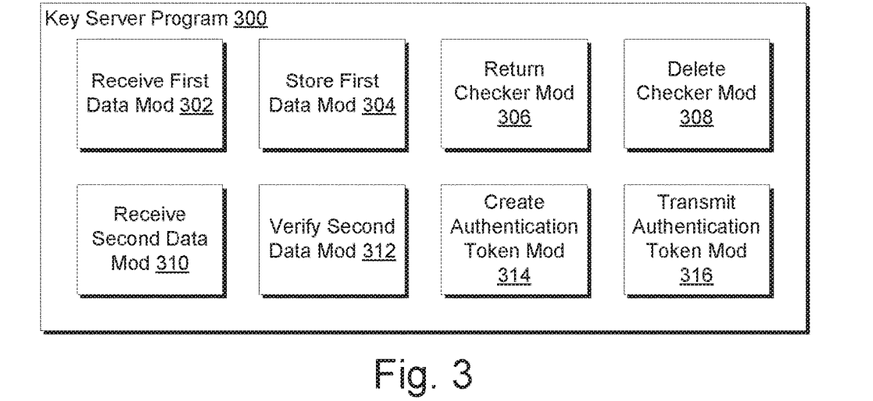
FIG. 3 is a block diagram view of a machine logic (e.g., software) portion of the first embodiment system.

FIG. 2 shows flowchart 250 depicting a method according to the present invention. FIG. 3 shows key server program 300, which performs at least some of the method operations of flowchart 250. This method and associated software will now be discussed, over the course of the following paragraphs, with extensive reference to FIG. 2 (for the method operation blocks) and FIG. 3 (for the software blocks). In this example, key server sub-system 102 receives a request to initialize a user account, then receives a request to create an authentication token segment for access to the user account.

Processing begins at operation S255, where receive first data module ("mod") 302 receives a first set of account data. In this example receive first data mod 302 receives from user device sub-system 104: (i) a hashed password; (ii) an account identifier; (iii) a checker; and/or (iv) a first authentication key segment. In some embodiments of the present invention, a hashed password is created by performing a hash function on a password and a device secret. In some embodiments, a device secret acts as a salt. Alternatively, a device secret allows first data mod 302 to derive a salt. A checker is sometimes also called a nonce. In further embodiments, a password is received from a user. In some other embodiments, a password is a low entropy value. For example, a low entropy value used as a password includes, but is not limited to, a voiceprint, a fingerprint, a retinal scan, etc. Alternative examples of low entropy values used as passwords include a pseudo-random string of symbols, or a user-generated string of symbols. In some embodiments, a device secret is a pseudo-random 512 digit binary number. A pseudo-random 512 digit binary number is sometimes also called a nonce. In some further embodiments, an account identifier is a pseudo-random 512 digit binary number. In other embodiments, a checker is a pseudo-random 512 digit binary number. In some embodiments, a checker is received in an encrypted manner. In some of these embodiments, a checker is received in an encrypted manner using a public encryption key corresponding to a private encryption key held by key server sub-system 102. In some embodiments of the present invention, receive first data mod 302 does not receive an account identifier and/or a checker. In some alternative embodiments, a first authentication key segment is a portion of an authentication key. In some embodiments, receive first data mod 302 receives a first authentication key segment based, at least in part, on a multiplicative sharing of a cryptographically secure signature scheme (sometimes also called a cryptographically secure scheme). Alternatively, receive first data mod 302 receives a first authentication key segment based, at least in part, on an additive sharing of a cryptographically secure signature scheme. In further embodiments, receive first data mod 302 receives a first authentication key segment that does not leak information about a second authentication key segment. In some embodiments, receive first data mod 302 receives a public verification key, consisting of a modulo and an exponent. In some alternative embodiments, receive first data mod 302, responsive to receiving a first set of account data, generates a first authentication key segment and/or a second authentication key segment. In further alternative embodiments, receive first data mod 302, responsive to receiving a first set of account data, transmits a first authentication key segment.

Processing proceeds to operation S260, where store first data mod 304 stores a subset of a first set of account data. In this example, store first data mod 304 stores, to account data storage 220, a subset of the first set of account data received in operation S255, including: (i) the hashed password; (ii) the first authentication key segment; and/or (iii) the account identifier. In some embodiments of the present invention, store first data mod 304 does not store an account identifier. In other embodiments, store first data mod 304 deletes account data in a first set of account data that is not stored.

Processing proceeds to operation S265, where return checker mod 306 returns a checker. In this example, return checker mod 306 returns the checker received in operation S255 to user device sub-system 104. In some embodiments of the present invention, return checker mod 306 does not return a checker because there was no checker received in operation S255. In some alternative embodiments, processing omits operation S265 and proceeds to operation S270. In further embodiments, return checker mod 306 decrypts a checker before returning the checker. In some of these embodiments, return checker mod 306 decrypts a checker using a private encryption key before returning the checker. In some alternative embodiments, return checker mod 306 does not return a checker, but instead returns a standard certificate. In further embodiments, return checker mod 306 acts as an explicit account creation acknowledgement.

Processing proceeds to operation S270, where delete checker mod 308 deletes a checker. In this example, delete checker mod 308 deletes the checker received in operation S255. In some embodiments of the present invention, delete checker mod 308 does not delete a checker because there was no checker received in operation S255. In some alternative embodiments, processing omits operation S270 and proceeds to operation S275.

Processing proceeds to operation S275, where receive second data mod 310 receives a second set of account data. In this example receive second data mod 310 receives from user device sub-system 104: (i) a double-hashed password; (ii) a message; and/or (iii) an account identifier. A message is sometimes also called an authentication token request transcript, a nonce, or a current time. In some embodiments of the present invention, receive second data mod 310 does not receive an account identifier. In some further embodiments, a double-hashed password is created by performing a hash function on a hashed password and a message. An authentication token request transcript can be a transcript of any challenge-response mechanism. In some embodiments, a transcript is a part of a handshake. For an example, an authentication token request transcript for a client authentication can be a transport layer security ("TLS") transcript, a secure sockets layer ("SSL") transcript, a secure shell ("SSH") transcript, an Internet protocol security ("IPsec") transcript, etc. In some embodiments, receive second data mod 310 does not receive an account identifier. In some further embodiments, receive second data mod 310 receives a hashed password, instead of a double-hashed password.

Processing proceeds to operation S280, where verify second data mod 312 verifies a second set of account data. In this example, verify second data mod 312 verifies: (i) the double-hashed password received in operation S275 against a hash function of the hashed password received in operation S255 and the message received in operation S275; and/or (ii) the account identifier received in operation S275 against the account identifier received in operation S255. In some embodiments of the present invention, verify second data mod 312 does not verify an account identifier. In some of these embodiments, an account identifier is not received in one or more of: (i) operation S255; and/or (ii) operation S275. In some further embodiments, verify second data mod 312 verifies a hashed password, instead of a double-hashed password. In some embodiments of the present invention, verify second data mod 312 includes a threshold manager. In some of these embodiments, verify second data mod 312 includes a threshold manager to track attempts to access an account. In some alternative embodiments, verify second data mod 312 blocks access to an account after three failed attempts to access an account. In some further embodiments, verify second data mod 312 counts iterations of operation S275 as attempts to access an account. In some of these embodiments, verify second data mod 312 counts iterations of operation S280 in which a second set of account data is not verified as failed attempts to access an account. In some alternative embodiments, verify second data mod 312 blocks access to an account after three failed attempts to access an account. In some embodiments of the present invention, processing terminates after verify second data mod 312 blocks access to an account.

Processing proceeds to operation S285, where create authentication token mod 314 creates a first authentication token segment. In this example, create authentication token mod 314 creates a first authentication token segment using the first authentication key segment received in operation S255 and the message received in operation S275. In some embodiments of the present invention, create authentication token mod 314 creates a first authentication token segment based, at least in part, on a cryptographically secure signature scheme. In some embodiments of the present invention, a first authentication token segment corresponds to a first authentication key segment. In some embodiments, create authentication token mod 314 creates a first authentication token segment based, at least in part, on a multiplicative sharing of a cryptographically secure signature scheme. Alternatively, create authentication token mod 314 creates a first authentication token segment based, at least in part, on an additive sharing of a cryptographically secure signature scheme. In further embodiments, create authentication token mod 314 creates a first authentication token segment that does not leak information about a second authentication token segment. In some embodiments, a first authentication token segment is a complete authentication token. In alternative embodiments, a first authentication token segment is an incomplete authentication token.

Processing terminates at operation S290, where transmit authentication token mod 316 transmits a first authentication token segment. In this example, transmit authentication token mod 316 transmits the first authentication token segment created in operation S285 to user device sub-system 104.

Figure 4:
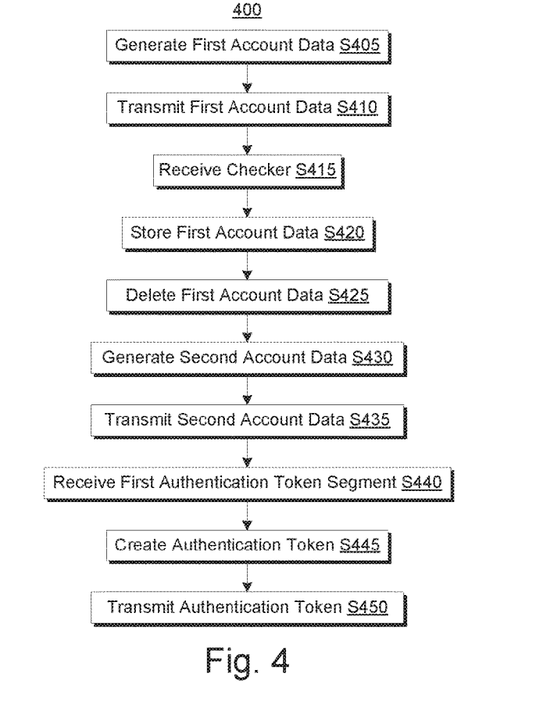
FIG. 4 is a flowchart showing a second embodiment method performed, at least in part, by the first embodiment system.
Figure 5:
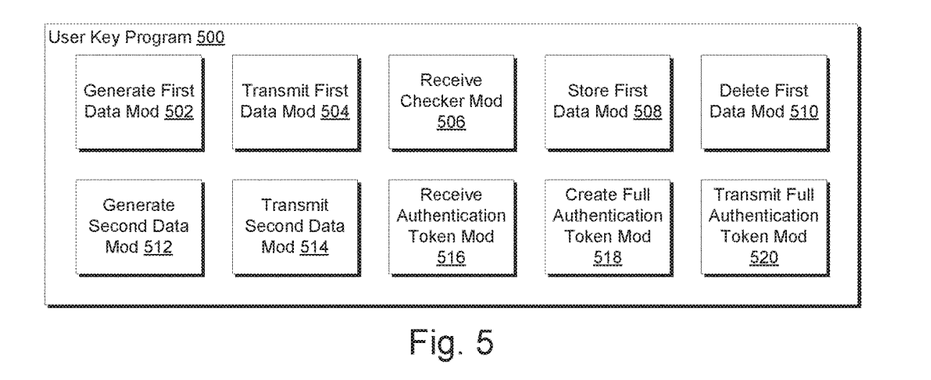
FIG. 5 is a block diagram view of a machine logic (e.g., software) portion of the first embodiment system.

FIG. 4 shows flowchart 400 depicting a method according to the present invention. FIG. 5 shows user key program 500, which performs at least some of the method operations of flowchart 400. This method and associated software will now be discussed, over the course of the following paragraphs, with extensive reference to FIG. 4 (for the method operation blocks) and FIG. 5 (for the software blocks). In this example, user device sub-system 104 initializes a user account with website server sub-system 106 on key server sub-system 102, then accesses the user account on website server sub-system 106.

Processing begins at operation S405, where generate first data mod 502 generates a first set of account data. In this example, generate first data mod 502 generates a first set of account data including, but not limited to: (i) a hashed password; (ii) a device secret; (iii) an account identifier; (iv) a checker; and/or (v) an authentication key. In some embodiments of the present invention, generate first data mod 502 generates a first set of account data responsive to a request from a user to access a website server. In some embodiments, generate first data mod 502 generates a hashed password by performing a hash function on a password and a device secret. In further embodiments, generate first data mod 502 receives a password from a user. In some of these embodiments, generate first data mod 502 generates a device secret as a pseudo-random 512 digit binary number. In some further embodiments, generate first data mod 502 generates an account identifier as a pseudo-random 512 digit binary number. In other embodiments, generate first data mod 502 generates a checker as a pseudo-random 512 digit binary number. In some alternative embodiments, generate first data mod 502 generates an authentication key using a cryptographically secure signature scheme. In some embodiments, generate first data mod 502 generates a private signing key, consisting of a modulo and an exponent, to generate an authentication key. Alternatively, generate first data mod 502 uses a previously generated public encryption key. In some of these embodiments, generate first data mod 502 generates a first authentication key segment and/or a second authentication key segment by segmenting an authentication key into a plurality of segments. In some alternative embodiments, generate first data mod 502 generates a first authentication key segment and a second authentication key segment, without generating an authentication key. In some embodiments of the present invention, generate first data mod 502 does not generate an account identifier and/or a checker. In some embodiments, generate first data mod 502 generates a first authentication key segment based, at least in part, on a sharing of a private signing key. In further embodiments, generate first data mod 502 creates a first authentication key segment that does not leak information about a second authentication key segment. In some alternative embodiments, generate first data mod 502 does not generate an authentication key, a first authentication key segment, and/or a second authentication key segment.

Processing proceeds to operation S410, where transmit first data mod 504 transmits a first set of account data. In this example, transmit first data mod 504 transmits to key server sub-system 102: (i) a hashed password; (ii) an account identifier; (iii) a checker; and/or (iv) a first authentication key segment. In some embodiments of the present invention, transmit first data mod 504 does not transmit an account identifier and/or a checker. In some alternative embodiments, transmit first data mod 504 authenticates a key server before transmitting a first set of account data. In some embodiments, transmit first data mod 504 transmits a private signing key, consisting of a modulo and an exponent. In some alternative embodiments, responsive to transmit first data mod 504 transmitting a first set of account data, transmit first data mod 504 receives a first authentication key segment and/or a second authentication key segment.

Processing proceeds to operation S415, where receive checker mod 506 receives a checker. In this example, receive checker mod 506 receives a checker from key server sub-system 102, to verify proper receipt of the first set of account data transmitted in operation S410. Here, receive checker mod 506 performs a comparison on the checker generated in operation S405 against the checker received in S415. In some embodiments of the present invention, processing omits operation S415 and proceeds to operation S420.

Processing proceeds to operation S420, where store first data mod 508 stores a subset of a first set of account data. In this example, store first data mod 508 stores, to account data storage 222, a subset of the first set of account data including, but not limited to: (i) the second authentication key segment; (ii) the device secret; (iii) the account identifier; and/or (iv) the public key (e.g., for RSA consisting of a modulo and an exponent). In some embodiments of the present invention, store first data mod 508 does not store an account identifier and/or a public encryption key. In other embodiments, store first data mod 508 deletes account data in a first set of account data that is not stored.

Processing proceeds to operation S425, where delete first data mod 510 deletes a subset of a first set of account data. In this example, delete first data mod 510 deletes a subset of the first set of account data including, but not limited to: (i) the first authentication key segment; (ii) the hashed password; (iii) the password; (iv) the checker; and/or (v) the authentication key. In some embodiments of the present invention, delete first data mod 510 deletes a subset of a first set of account data as a security measure. In some embodiments, delete first data mod 510 also deletes an account identifier and/or a public encryption key. In further embodiments, delete first data mod 510 does not delete a checker and/or an authentication key as these subsets of a first set of account data are not generated in operation S405.

Processing proceeds to operation S430, where generate second data mod 512 generates a second set of account data. In this example, generate second data mod 512 generates a second set of account data including, but not limited to: (i) a double-hashed password; and/or (ii) a message. In some embodiments of the present invention, generate second data mod 512 generates a second set of account data responsive to a request from a user to access a website server. In some embodiments, generate second data mod 512 generates a double-hashed password by performing a hash function on a hashed password a message. In some of these embodiments, generate second data mod 512 generates a hashed password by performing a hash function on a password and a device secret. In further embodiments, generate second data mod 512 generates a message based, at least in part, on a set of communications with a website server. In some embodiments, generate second data mod 512 generates a hashed password, instead of a double-hashed password.

In some embodiments of the present invention, a hashed password is less susceptible to compromise by an adversary. In some of these embodiments, a hashed password is less susceptible to compromise because salting a password with a device secret increases a level of entropy in the hashed password. In further embodiments, a double-hashed password is less susceptible to compromise by an adversary. In some of these embodiments, a double-hashed password is less susceptible to compromise because salting a hashed password with a message (sometimes also called an authentication token request transcript) increases a level of entropy in the double-hashed password. In some embodiments, a level of entropy of a password (before salting or hashing) is irrelevant.

Processing proceeds to operation S435, where transmit second data mod 514 transmits a second set of account data. In this example, transmit second data mod 514 transmits to key server sub-system 102: (i) a double-hashed password; (ii) a message; and/or (iii) an account identifier. In some embodiments of the present invention, transmit second data mod 514 does not transmit an account identifier. In some further embodiments, transmit second data mod 514 transmits a hashed password, instead of a double-hashed password.

Processing proceeds to operation S440, where receive authentication token mod 516 receives a first authentication token segment. In this example, receive authentication token mod 516 receives a first authentication token segment from key server sub-system 102.

Processing proceeds to operation S445, where create full authentication token mod 518 creates a full authentication token. In this example, create full authentication token mod 518 creates a second authentication token segment using the second authentication key segment generated in operation S405 and the message created in operation S430. Here, create full authentication token mod 518 creates a full authentication token by combining the first authentication key received in operation S440 with the second authentication key. Further, in this example, create full authentication token mod 518 validates the full authentication token using the public encryption key generated in operation S405 and the message. In some embodiments of the present invention, create full authentication token mod 518 creates a full authentication token without separately creating a second authentication token segment. In some alternative embodiments, create full authentication token mod 518 does not validate a full authentication token. In some embodiments, create full authentication token mod 518 creates a full authentication token based, at least in part, on a sharing of a cryptographically secure private key. In some embodiments, a second authentication token segment is a complete authentication token. In alternative embodiments, a second authentication token segment is an incomplete authentication token. In further embodiments, a full authentication token is a combination of a plurality of complete authentication tokens. Alternatively, a full authentication token is a combination of a plurality incomplete authentication tokens.

Processing terminates at operation S450, where transmit full authentication token mod 520 transmits a full authentication token. In this example, transmit full authentication token mod 520 transmits a full authentication token and a message to website server sub-system 106. In some embodiments of the present invention, transmit full authentication token mod 520 does not transmit a message. In some embodiments, transmit full authentication token mod 520 transmits a full authentication token to complete authentication.

III. Further Comments and/or Embodiments

Some embodiments of the present invention recognize the following facts, potential problems, and/or potential areas for improvement with respect to the current state of the art: (i) authentication methods require cumbersome physical devices; (ii) authentication methods are susceptible to attack from adversaries; (iii) authentication methods require extensive computing power.

Figure 6:
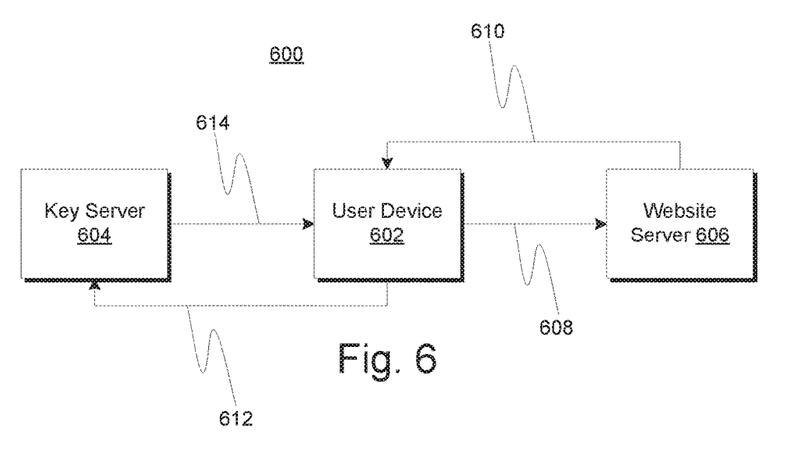
FIG. 6 is a block diagram view of an embodiment of a system according to the present invention.

FIG. 6 shows data communication environment 600 depicting communication among three entities according to an embodiment of the present invention. In this example, the three entities are: user device 602; key server 604; and website server 606. Data communication among these three entities proceeds along data communication pathways 608, 610, 612, and 614.

User device 602 transmits a set of requests to website server 606 along data communication pathway 608. A user device is sometimes also called a prover. In some embodiments of the present invention, user device 602 transmits a request to website server 606 to create a user account. Alternatively, user device 602 transmits a request to website server 606 to access a user account. In further alternative embodiments, user device 602 transmits a full authentication token to website server 606.

Website server 606 transmits a set of responses to user device 602 along data communication pathway 610. Alternatively, website server 606 initiates a handshake with user device 602.

User device 602 transmits various account data to key server 604 along data communication pathway 612. A key server is sometimes also called a verifier. In some embodiments of the present invention, user device 602 transmits to key server 604: (i) a hashed password; (ii) an account identifier; (iii) a checker; and/or (iv) a first authentication key segment. In alternative embodiments, user device 602 transmits to key server 604: (i) a double-hashed password; (ii) an authentication token request transcript; and/or (iii) an account identifier.

Key server 604 transmits various account data to user device 602 along data communication pathway 614. In some embodiments of the present invention, key server 604 transmits a checker to user device 602. Alternatively, key server 604 transmits an authentication token segment to user device 602.

In some embodiments of the present invention, user device 602 and key server 604 jointly generate, in a distributive manner, a first authentication key segment and/or a second authentication key segment. In some of these embodiments, neither user device 602 nor key server 604 has access to both a first authentication key segment and a second authentication key segment. In further embodiments, user device 602 and key server 604 jointly generate a first authentication key segment and/or a second authentication key segment using a plurality of cryptographic keys and transmitting data along data communication pathway 612 and data communication pathway 614.

Some embodiments of the present invention may include one, or more, of the following features, characteristics, and/or advantages: (i) distributing cryptographic material over at least a user device and a server; (ii) generating authentication tokens using at least a user device and a server; (iii) generating an authentication token using authentication key segments distributed across various devices; (iv) engaging in a distributed protocol to derive an authentication token; (v) receiving various passwords corresponding to various accounts; and/or (vi) receiving various passwords corresponding to various account tokens.

Some embodiments of the present invention may include one, or more, of the following features, characteristics, and/or advantages: (i) maintaining a level of security while lowering a required strength of a password; (ii) providing for encrypted access to a website server; (iii) authenticating a user prior to granting access to a website server; and/or (iv) authenticating a device prior to granting access to a website server.

Some embodiments of the present invention may include one, or more, of the following features, characteristics, and/or advantages: (i) authenticating a user based, at least in part, on an authentication token; (ii) authenticating a user based, at least in part, on a certificate; (iii) splitting an authentication key (sometimes also called a secret key) into a plurality of segments; (iv) hashing a password with a salt; (v) hashing a password with a salt to generate a double hashed password; and/or (vi) storing a device secret on a user device.

Some embodiments of the present invention may include one, or more, of the following features, characteristics, and/or advantages: (i) generating an authentication token (sometimes also called a full authentication token) over a user device and a set of key servers; (ii) integrating (sometimes also called collaboratively generating) a plurality of authentication token segments to create a full authentication token; (iii) integrating a plurality of authentication token segments to create a full authentication token without alerting a website server that the full authentication token is integrated; (iv) restricting integration of an authentication token to require a set of user devices and/or a set of key servers (i.e., at least two total user devices and/or key servers); (v) decreasing trust levels in a set of user devices and/or a set of key servers; and/or (vi) limiting account data exposed to an adversary in the event a user device and/or a key server is attacked.

Some embodiments of the present invention may include one, or more, of the following features, characteristics, and/or advantages: (i) employing an application on a user device; (ii) using a distributed authentication key for online banking; (iii) registering a set of authentication key segments with a register manager on a key server; (iv) employing a cryptographic library; (v) employing a cryptographic library for an authentication key; and/or (vi) employing a cryptographic library for an authentication token.

Some embodiments of the present invention may include one, or more, of the following features, characteristics, and/or advantages: (i) deleting a set of account data from a key server; (ii) suspending a set of account data from a website server; (iii) suspending a set of account data from a key server; (iv) modifying a set of account data on a website server; (v) modifying a set of account data on a key server; (vi) modifying a set of account data through offline means; (vii) creating an expiration date for a set of account data; (viii) locking access to an account based, at least in part, on a number of failed access attempts; (ix) locking access to an account based, at least in part, on a geographical location of an access attempt; and/or (x) recording attempts to access an account in a threshold manager.

Some embodiments of the present invention may include one, or more, of the following features, characteristics, and/or advantages: (i) integrating a full authentication token is standardized across a set of user devices and/or a set of key servers; (ii) isolating various segments of an authentication key; (iii) isolating various segments of an authentication key to restrict ability to recreate the authentication key; and/or (iv) distributed generation of authentication tokens; and/or (v) performing distributed authentication key storage without reconstructing an authentication key.

IV. Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes—no style confirmation from a human source.

"Automatically" means "without any human intervention."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A method comprising:
    receiving, by a user device, a request to access a website server, the request including a password of the user;
    generating, in response to receiving the request to access the website server and by the user device, a first set of account data;
    transmitting, by the user device, a subset of the first set of account data to a key server sub-system, wherein the subset of the first set of account data includes an authentication token request transcript, wherein the authentication token request transcript is a message and a dataset, and wherein the message and the dataset are derived, at least in part, from the password;
    receiving, by the user device and from the key server sub-system, a first authentication token segment;
    generating, by the user device, a second authentication token segment;
    generating, by the user device, a full authentication token based, at least in part, on:
        a first set of authentication key segments of a plurality of authentication key segments, the authentication token request transcript,
        the first authentication token segment; and
        the second authentication token segment;
    transmitting, by the user device, the full authentication token to the website server; and
    granting, by the key server sub-system, access for the user device to the website server, wherein the transmitting the full authentication token further comprises transmitting a message to website server, wherein storing a subset of the first set of account data further includes storing a second set of authentication key segments, a device secret, an account identifier, and a public key, wherein a first set of account data includes a password that includes a low entropy value, wherein the low entropy password is a voiceprint, a fingerprint, and a retinal scan, wherein generating a second set of account data, responsive to a request from a user to access a website server, further comprises:
        validating the authentication token using the public key and the message;

receiving a checker from the key server sub-system to verify proper receipt of the subset of the first set of transmitted account data, wherein the verification is verifying the full authentication token based, at least in part, on a comparison between a generated checker and the received checker;

storing the subset of the first set of account data; and deleting a portion of the subset of the first set of account data.

2. The method of claim 1, further comprising:

verifying the full authentication token based, at least in part, on a comparison of the first set of account data against a second set of account data;

wherein:
  the first set of account data further includes a double-hashed password, and the double-hashed password is generated by hashing a hashed password, wherein the result is combined with a salt, wherein the hashing is performed using a hashing function, and wherein the salt is the authentication token request transcript.

3. The method of claim 1, further comprising:

transmitting a subset of a second set of account data, wherein the subset of the second set of account data:
  includes, at least, a second set of authentication key segments of the plurality of authentication key segments, and
  does not include, at least, the first set of authentication key segments.

4. The method of claim 3, wherein:

the subset of the first set of account data further includes a first account identifier, and the subset of the second set of account data further includes a second account identifier.

5. The method of claim 3, further comprising:

generating the second set of account data that includes a second password and a second message by performing a hash function on a hashed password, wherein the second message is based, in part, on a set of communications with the website server;

wherein:
  the second set of account data further includes a hashed password.

6. The method of claim 5, wherein generating the second set of account data includes:

generating the hashed password by hashing the second password, wherein the result is combined with a salt, wherein the hashing is performed using a hashing function;

wherein:
  the salt is a pseudo-randomly generated value, and
  the second password is received from a user.

7. A computer program product comprising:

one or more non-transitory computer-readable storage media and program instructions stored on at least one of the one or more non-transitory computer-readable storage media, the program instructions executable by a processor, the program instructions comprising:

program instructions to receive, by a user device, a request to access a website server, the request including a password of the user;

program instructions to generate, in response to receiving the request to access the website server and by the user device, a first set of account data;

program instructions to transmit, by the user device, a subset of the first set of account data to a key server sub-system, wherein the subset of the first set of account data includes an authentication token request transcript, wherein the authentication token request transcript is a message and a dataset, and wherein the message and the dataset are derived, at least in part, from the password;

program instructions to receive, by the user device and from the key server sub-system, a first authentication token segment;

program instructions to generate, by the user device, a second authentication token segment;

program instructions to, by the user device, a full authentication token based, at least in part, on:
  a first set of authentication key segments of a plurality of authentication key segments,
  the authentication token request transcript,
  the first authentication token segment; and
  the second authentication token segment;

program instructions to, by the user device, the full authentication token to the website server; and program instructions to grant, by the key server sub-system, access for the user device to the website server, wherein transmitting the full authentication token further comprises transmitting a message to website server, wherein storing a subset of the first set of account data further includes storing a second set of authentication key segments, a device secret, an account identifier, and a public key, wherein a first set of account data includes a password that includes a low entropy value, wherein the low entropy password is a voiceprint, a fingerprint, and a retinal scan, wherein generating a second set of account data, responsive to a request from a user to access a website server, further comprises:

program instructions to validate the authentication token using the public key and the message;

program instructions to receive a checker from the key server sub-system to verify proper receipt of the subset of the first set of transmitted account data, wherein the verification is verifying the full authentication token based, at least in part, on a comparison between a generated checker and the received checker;

program instructions to store the subset of the first set of account data;

program instructions to delete a portion of the subset of the first set of account data.

8. The computer program product of claim 7, further comprising:

program instructions to receive a checker from the key server sub-system to verify proper receipt of the subset of the first set of transmitted account data, wherein the verification is verifying the full authentication token based, at least in part, on a comparison between a generated checker and the received checker;

program instructions to generate a first set of account data responsive to a request from a user to access the website server;

wherein:

the first set of account data further includes a double-hashed password, and the double-hashed password is generated by hashing a hashed password, wherein the result is combined with a salt, wherein the hashing is performed using a hashing function, and wherein the salt is the authentication token request transcript.

9. The computer program product of claim 7, further comprising:

program instructions to transmit a subset of a second set of account data, wherein the subset of the second set of account data:

includes, at least, a second set of authentication key segments of the plurality of authentication key segments, and
does not include, at least, the first set of authentication key segments.

10. The computer program product of claim 9, wherein:
the subset of the first set of account data further includes a first account identifier, and
the subset of the second set of account data further includes a second account identifier.

11. The computer program product of claim 9, further comprising:
program instructions to generate a second set of account data that includes a second password and a second message by performing a hash function on a hashed password, wherein the second message is based, in part, on a set of communications with the website server;
wherein:
the second set of account data further includes a hashed password.

12. The computer program product of claim 11, further comprising:
program instructions to generate the hashed password by hashing the second password, wherein the result is combined with a salt, wherein the hashing is performed using a hashing function;
wherein:
the salt is a pseudo-randomly generated value, and
the second password is received from a user.

13. A method comprising:
receiving, by a key server sub-system, a request to initialize a user account that includes a password of the user;
receiving, by the key server sub-system, a request to generate a first authentication token segment for access to the requested user account;
receiving, by the key server sub-system, a first set of account data generated by a user device and in response to a request to access a website server, wherein the first set of account data includes an authentication token request transcript, wherein the authentication token request transcript is a message and a dataset, and wherein the message and the dataset are derived, at least in part, from the password;
generating, by the key server sub-system and the user device, the first authentication token segment, wherein the first authentication token segment is based, at least in part, on:
a first set of authentication key segments of a plurality of authentication key segments, and
the authentication token request transcript;
the first authentication token segment; and
generating, by the key server sub-system and the user device, a second authentication token segment;
granting, by the key server sub-system, access for the user device to the requested user account;
transmitting, by the key server sub-system, the first authentication token segment to the user device subsystem;
receiving, by the key server sub-system, a second set of account data, wherein the second set of account data includes the first set of authentication key segments; and verifying the first set of account data based, at least in part, on a comparison of a first double-hashed password to a second double-hashed password;
wherein:
the first set of account data further includes the first double-hashed password,
the second double-hashed password is generated by hashing a hashed password, wherein the result is combined with a salt, wherein the hashing is performed using a hashing function, and wherein the salt is the authentication token request transcript, and
the second set of account data further includes the second double-hashed password.

14. The method of claim 13, further comprising:
verifying the first set of account data based, at least in part, on a comparison of a first hashed password to a second hashed password;
wherein:
the second set of account data further includes the first hashed password, and
the first set of account data further includes the second hashed password.

15. The method of claim 13, further comprising:
verifying the first set of account data based, at least in part, on a comparison of a first account identifier to a second account identifier;
wherein:
the second set of account data further includes the first account identifier, and
the first set of account data further includes the second account identifier.

16. The method of claim 13, wherein transmitting the full authentication token further comprises transmitting a message to website server, wherein storing a subset of the first set of account data further includes storing a second set of authentication key segment, a device secret, an account identifier, and a public key, wherein a first set of account data includes a password that includes a low entropy value, wherein the low entropy password is a voiceprint, a fingerprint, and a retinal scan, wherein generating a second set of account data, responsive to a request from a user to access a website server, further comprises:
validating the authentication token using the public key and the message;
receiving a checker from the key server sub-system to verify proper receipt of the subset of the first set of transmitted account data, wherein the verification is verifying the full authentication token based, at least in part, on a comparison between a generated checker and the received checker;
returning the checker to user device sub-system in response to decrypting the checker utilizing a private encryption key, wherein the checker acts as an explicit account creation acknowledgement;
deleting the checker;
storing the subset of the first set of account data to a data storage; and
deleting a portion of the subset of the first set of account data.

* * * * *